US010438037B1

(12) United States Patent
Tripathy et al.

(10) Patent No.: US 10,438,037 B1
(45) Date of Patent: *Oct. 8, 2019

(54) TRANSACTION OPTIMIZATION THROUGH SCANNED DATA

(71) Applicant: United Services Automobile Association (USAA), San Antonio, TX (US)

(72) Inventors: Shantanu Tripathy, San Antonio, TX (US); David Lindley, Boerne, TX (US); Ricardo Alcantar, San Antonio, TX (US); Adam Walker Moran, San Antonio, TX (US); Rupesh Dhakal, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,874

(22) Filed: Dec. 6, 2018

Related U.S. Application Data

(63) Continuation of application No. 15/711,459, filed on Sep. 21, 2017, now Pat. No. 10,198,609.

(60) Provisional application No. 62/397,669, filed on Sep. 21, 2016.

(51) Int. Cl.
*G06K 7/10* (2006.01)
*G06K 7/14* (2006.01)

(52) U.S. Cl.
CPC ....... *G06K 7/1413* (2013.01); *G06K 7/10722* (2013.01); *G06K 7/10881* (2013.01); *G06K 2007/10524* (2013.01)

(58) Field of Classification Search
CPC ............ G06K 7/1413; G06K 7/10722; G06K 7/10881; G06K 2007/10524
USPC ............. 235/462.1, 462.44, 462.45, 462.46, 235/472.01, 472.02, 472.03
See application file for complete search history.

(56) References Cited

U.S. PATENT DOCUMENTS 10,198,609 B1 * 2/2019 Tripathy .............. G06K 7/1413
2013/0204645 A1 8/2013 Lehman

* cited by examiner

*Primary Examiner* — Karl D Frech
(74) *Attorney, Agent, or Firm* — Fish & Richardson P.C.

(57) ABSTRACT

Techniques are described for facilitating and/or optimizing a transaction, such as a purchase transaction, through the use of scanned data. In some implementations, a user may use a portable computing device to scan a vehicle tag (e.g., vehicle identification number) that is affixed to a vehicle and determine vehicle information. The user may also scan a user tag such as a driver's license to determine user data that identifies the user. The vehicle data and/or user data may be communicated to transaction service(s), which generate transaction data that may be specific to the particular user that provided the vehicle data and/or user data. The transaction data may include information regarding a price of the vehicle, terms of a loan that the user may take out to finance the purchase of the vehicle, information regarding an insurance policy for insuring the vehicle, and so forth.

20 Claims, 7 Drawing Sheets

TRANSACTION OPTIMIZATION THROUGH SCANNED DATA

CROSS-REFERENCE TO RELATED APPLICATIONS

This application is a continuation application of and claims priority to U.S. application Ser. No. 15/711,459, titled "Transaction Optimization Through Scanned Data," filed on Sep. 21, 2017, which is related to, and claims priority to, U.S. Provisional Patent Application Ser. No. 62/397,669, titled "Transaction Optimization Through Scanned Data," which was filed on Sep. 21, 2016, the entirety of which are incorporated by reference into the present disclosure.

BACKGROUND

For an average individual, purchasing a vehicle or other expensive item may be a stressful experience. The potential purchaser walking through a showroom or a vehicle sales lot may be confronted with sales personnel whose goal is to maximize the sale price and who may not necessarily be focused on the purchaser's concerns. Moreover, the purchaser may be disadvantaged during negotiations with the seller, given that the purchaser may not have on-site access to objective information that would inform the purchase decision. For these reasons, the purchaser may lack confidence that they are getting the best deal or that their other concerns have been adequately addressed.

SUMMARY

Implementations of the present disclosure are generally directed to facilitating and/or optimizing a transaction, such as a purchase. More specifically, implementations are directed to using scanned data, such as scanned vehicle data and/or scanned user data, to facilitate and/or optimize a transaction.

In general, innovative aspects of the subject matter described in this specification can be embodied in methods that include actions of: scanning, using at least one scanning component, a vehicle tag that encodes vehicle data describing a vehicle, and receiving, from the at least one scanning component, the vehicle data that is retrieved by scanning the vehicle tag; scanning, using the at least one scanning component, a user tag that encodes user data describing a user, and receiving, from the at least one scanning component, the user data that is retrieved by scanning the user tag; transmitting, over at least one network, the vehicle data and the user data to a transaction service executing on at least one remote server computing device and receiving, in response, transaction data that is generated by the transaction service based at least partly on the vehicle data and the user data, the transaction data associated with a purchase of the vehicle by the user, the transaction data including a price of the vehicle; and presenting the transaction data in a user interface (UI) executing on the portable computing device.

Implementations can optionally include one or more of the following features: the user tag is a physical credential of the user; scanning the user tag includes capturing at least one image of the physical credential and performing pattern recognition to determine, as the user data, text information including one or more of a user name and a user identification number that is on the physical credential; the vehicle tag is a printed decal affixed to the vehicle; scanning the vehicle tag includes capturing at least one image of the printed decal and performing pattern recognition to determine, as the vehicle data, text information including a vehicle identification number (VIN) that is on the printed decal; the vehicle tag is a printed decal affixed to the vehicle, the printed decal including a scannable barcode; scanning the vehicle tag includes capturing at least one image of the scannable barcode and decoding the scannable barcode to determine, as the vehicle data, a vehicle identification number (VIN) that is encoded in the scannable barcode; the actions further include transmitting, over the at least one network to the transaction service, a request to purchase the vehicle, the request provided by the user through the UI executing on the portable computing device; the actions further include receiving, from the transaction service, in response to the request to purchase the vehicle, a code that is presented in the UI, wherein entry of the code at a kiosk causes the kiosk to dispense at least one key to the vehicle; the transaction data further includes one or more of loan information, insurance information, vehicle history information, and vehicle cost information; and/or the price is guaranteed, by the transaction service, for a limited period of time.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over previously available solutions. By capturing vehicle data and/or user data by scanning physical tags associated with the vehicle and/or user respectively, and by using the scanned data to generate transaction information for purchase of a vehicle, implementations provide a data entry and transaction processing system that is more efficient, more accurate, and less error-prone than traditional systems that may collect the necessary data in other ways, given the high accuracy of (e.g., optical) scanning to recognize printed characters and/or decode scannable barcodes that include the vehicle data and/or user data. Accordingly, implementations avoid the expenditure of processing power, active memory, storage space, network capacity, and/or other computing resources that may be consumed by previously available solutions to recover from inaccuracies in entered data and/or incomplete data entry.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
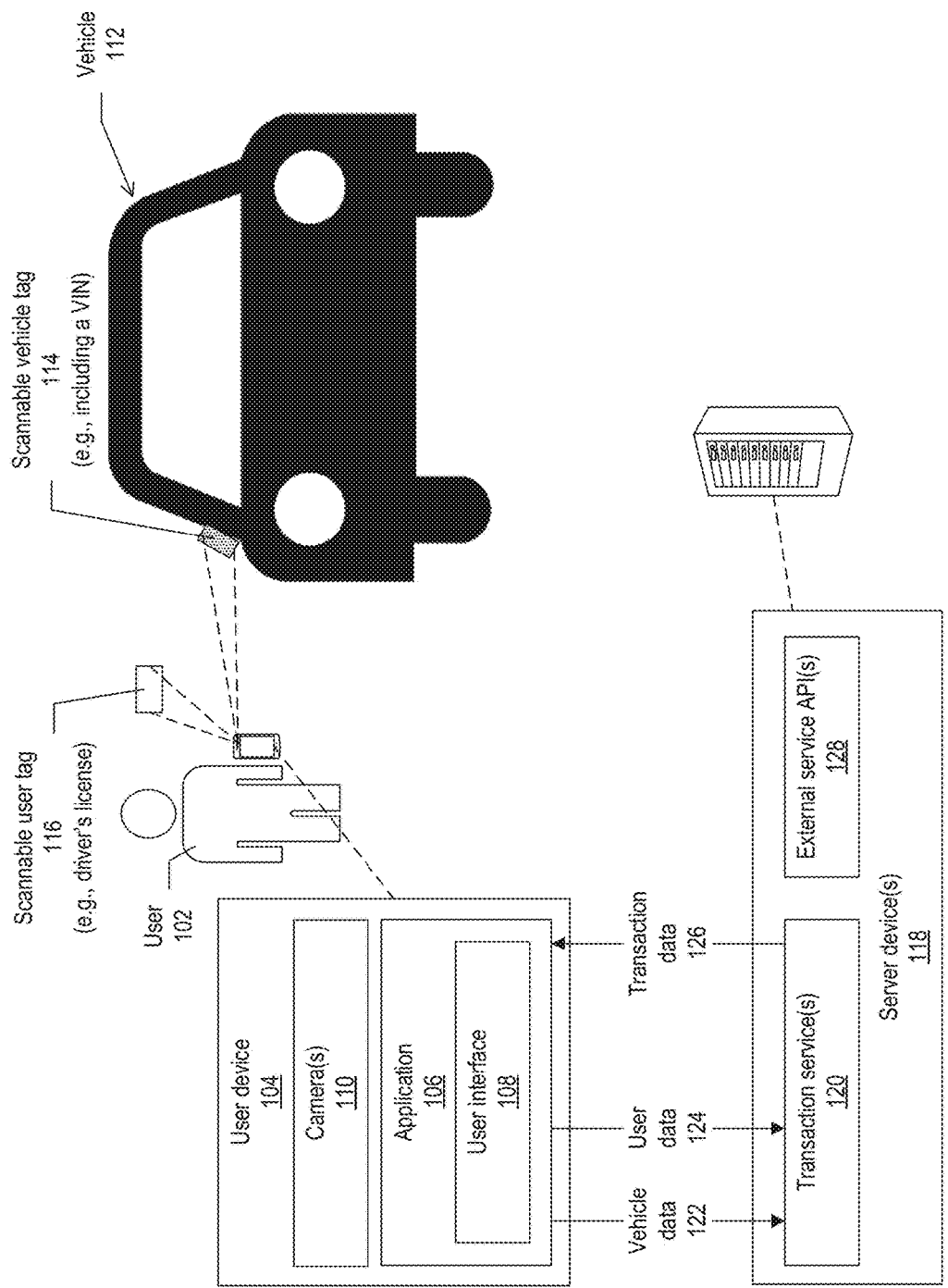
FIG. 1 depicts an example system for transaction processing, according to implementations of the present disclosure.

Implementations of the present disclosure are directed to facilitating and/or optimizing a transaction, such as a purchase transaction, through the use of scanned data. In some implementations, a user may use their smartphone, tablet computer, or other computing device to scan a vehicle tag that is affixed to a vehicle. The vehicle tag may be a vehicle identification number (VIN), manufacturer label, and so forth, and may include vehicle data describing the vehicle. The user may also scan a user tag or token such as a driver's license to generate user data that identifies the user. The vehicle data and/or user data may be communicated, over one or more networks, to transaction service(s). Based on the received information, the service(s) may generate transaction data that may be specific to the particular user that provided the vehicle data and/or user data. The transaction data may include information regarding a price of the vehicle (e.g., a guaranteed price), terms of a loan that the user may take out to finance the purchase of the vehicle, information regarding an insurance policy for insuring the vehicle, and so forth.

The transaction data may be presented in a user interface (UI) of an application executing on the user's computing device. In some implementations, the transaction data may be presented in a scorecard in the UI, as a summary of the price information, loan information, insurance information, and/or other information that may be employed by the user in deciding to purchase the vehicle. If the user decides to purchase the vehicle, the UI may present one or more controls to allow the user to indicate the purchase. Selection of such control(s) may cause the purchase transaction to be automatically completed according to the (e.g., guaranteed) price communicated in the transaction data. Selection of the control(s) may also indicate the user's application for the loan, application for the insurance policy, and/or cause other action(s) to be performed to facilitate the user's acquisition of the vehicle. In some implementations, the completion of the purchase may cause a communication to be sent from the service(s) to the user's computing device. The communication may include a code that is presented in the UI. The code may be entered at a kiosk or other device, and entry of the appropriate code may cause the kiosk to dispense one or more physical keys that are useable to operate the vehicle.

In this way, implementations provide for a transaction process that is partly or completely automated, such that the user may not need to interact with a human sales person to purchase the vehicle. By providing the transaction data that is readily available on the user's portable computing device, implementations enable the user to have greater confidence that the purchase they are making is a good value, and that sales personnel are not taking advantage of them. Implementations provide service(s) that handle some or all of the purchase process for the user. In some instances, the transaction is facilitated to such an extent that the user may not be required to negotiate (e.g., haggle) at all with any sales personnel, providing for a much more positive user experience than in traditional sales environments where the user may be under high pressure to buy but may not have access to objective information on which a purchase decision may be based.

FIG. 1 depicts an example system for transaction processing, according to implementations of the present disclosure. As shown in the example of FIG. 1, a user 102 (e.g., a potential purchaser or customer) may operate a user device 104. In some instances, the user device 104 is a portable computing device such as a smartphone, tablet computer, wearable computer, and so forth. The user device 104 may execute an application 106, which may include a UI 108. In some implementations, the UI 108 is a graphical user interface (GUI). The user device 104 may include one or more cameras 110, which may also be described as scanning component(s) of the user device 104. The camera(s) 110 may include any suitable type of image capture device that is configured, through optics, electronics, or both, to capture still image(s) and/or video data of a scene in a field of view in proximity to the user device 104. In some implementations, the camera(s) 110 may be component(s) of the user device 104 as shown in the example of FIG. 1. Alternatively, the camera(s) 110 may be external to the user device 104 and may communicate image data and/or other information to the application 106 using one or more wired and/or wireless connections, such as a Bluetooth™ connection or other type of wireless network connection. The camera(s) 110 may capture image(s) and/or video data in a visible range of wavelengths and/or in a wavelength range that is outside the visible range (e.g., infrared).

In some instances, the user 102 may be in a product sales environment such as an automobile dealership, showroom, sales lot, and so forth. The user 102 may be perusing a vehicle 112 as a possible purchase. The user 102 may employ the camera(s) 110 to scan a vehicle tag 114 and retrieve vehicle data 122 from the tag 114. In some instances, the tag 114 is a vehicle identification number (VIN) affixed to the vehicle 112. The VIN may uniquely identify the vehicle 112 amongst a plurality of vehicles. In some instances, the tag 114 may be a manufacturer sticker and/or decal that is affixed to the vehicle 114, and that presents information regarding the vehicle 112 such as the make, model, year, color, trim options, mileage, manufacturer's suggested retail price (MSRP), seller's actual price, and so forth. The camera(s) 110 may generate image(s) of the tag 114 which are provided to the application 106. The application 106 may analyze the image(s) and retrieve vehicle data 112 from the image(s). The vehicle data 122 retrieved from the vehicle tag 114 may include, but is not limited to: a VIN; the make, model, and/or year of the vehicle; trim and/or option details for the particular vehicle; and so forth. In some instances, the user device 104 may capture image(s) of the vehicle 112 as a whole and/or portion(s) of the vehicle 112, e.g., from various viewpoints, and the image(s) may be analyzed to identify the vehicle's make, mode, year, trim options, and so forth. Scanning of image of the vehicle may be performed in instances when a scannable vehicle tag 114 is not present and/or not accessible for scanning.

The camera(s) 110 may also be used to scan a user tag 116. The user tag 116 may be an identification card or other type of physical credential that is uniquely associated with, and/or that identifies, the user 102, such as a driver's license, passport, military identification card, other type of government-issued identification card, printed bill, student identification card, and so forth. The user tag 116 may be scanned to extract user data 124 from the user tag 116, such as the user's name (e.g., first, last, and/or middle name), identification number, physical address, email address, phone number, and/or other identifying information.

Implementations support the use of various suitable techniques for scanning the tags 114 and/or 116 to extract the vehicle data 122 and user data 124 respectively. In some implementations, image(s) of the tag(s) may be captured and analyzed using optical character recognition (OCR) or other types of pattern recognition to determine alphanumeric characters, symbols, words, and/or sequences of characters, symbols, and/or words present in the tag(s). In some implementations, the tag(s) may include barcode(s) that are scannable to retrieve data that is encoded into the barcode(s). Such barcode(s) may employ any suitable encoding format. The barcode(s) may be one-dimensional barcode(s), such as universal product codes (UPCs). The barcode(s) may also be multi-dimensional barcode(s) and/or matrix barcode(s), such as a quick response (QR) codes. In some instances, the tag(s) may include radio frequency identification (RFID) and/or near field communication (NFC) tag(s) that emit a radio frequency signal, e.g., in response to receive a triggering and/or interrogating signal, which may also be described as an activation signal. In such instances, the signal(s) emitted from the tag(s) may include information such as the vehicle data 122 and/or user data 124, and scanning the tag(s) may include sending an interrogating signal from the user device 104, and receiving and processing the tag-emitted signals to determine the vehicle data 122 and/or user data 124.

One or both of the vehicle data 122 and/or the user data 124 may be communicated from the application 106, over one or more networks, to transaction service(s) 120 executing on one or more server devices 118. The server device(s) 118 may include any suitable number and type of computer device(s). Based at least partly on the vehicle data 122 and/or user data 124, the service(s) 120 may generate transaction data 126 that is particular to the user 102 and/or the vehicle 112. The transaction data 126 may include, but is not limited to, one or more of the following.

Price information, describing a price to purchase the vehicle 112. In some instances, the price may be a guaranteed price, such that the sending of the transaction data 126 is a guarantee that the user 102 may purchase the vehicle 112 at the price for a certain period of time that is limited. For example, the guarantee may hold the price of the vehicle 112 for up to 24 hours, such that the user may purchase the vehicle at that price at any time within 24 hours from the time when the price guarantee is provided to the user. After that time, if the user wishes to purchase the vehicle, the purchase may not be possible at the previously guaranteed price. The guaranteed price information may be provided for the vehicle 112 that the user 102 is currently examining (e.g., having the scanned vehicle tag) and/or other nearby vehicles within a range specified by the user 102 through the UI 108.

Loan information, describing the terms of a loan that the user 102 may take out to finance their purchase of the vehicle 112. The loan information may include an amount of the loan, a payoff amount, an interest rate, monthly payments (e.g., principal and/or interest payments), a term of the loan (e.g., number of months to pay off the loan), an indication of the financial institution providing and/or servicing the loan, and so forth. The sending of the transaction data 126 may be an offer of the loan (e.g., the user having pre-qualified for the loan), under the described terms, from the service(s) 120 (or from a financial institution that manages the services) to the user 102.

Insurance information, describing the terms of an insurance policy that the user 102 may take out to insure the vehicle 112. The insurance information may include terms such amount(s) of property damage and/or injury coverage, premiums, deductibles, time period for the policy, conditions on the policy, and so forth. The sending of the transaction data 126 may be an offer of the insurance policy (e.g., the user having pre-qualified for the policy), under the described terms, from the service(s) 120 (or from an insurance provider that manages the services) to the user 102.

Vehicle history information, describing a history of repairs, maintenance, parts replacement, accidents, prior ownership, and/or other information regarding the history of the vehicle 112.

Vehicle cost information, including estimated maintenance, repair, and/or operating costs of the vehicle 112 for a period of time in the future. Such cost information may include fuel costs, costs to replace engine components, tires, or other parts of the vehicle, estimated maintenance costs based on the costs of other vehicles of the same make, model, year, and/or other characteristics, and so forth. Such information may provide a total (e.g., monthly, yearly, etc.) cost of ownership for the vehicle in the future.

Other vehicle information, including the availability and/or price of other instances of the same and/or similar vehicle at other (e.g., nearby) sellers. In some implementations, the UI 108 may enable the user 102 to specify a distance or range to search for similar nearby vehicles, e.g., within 5 miles of the current location, within 50 miles of the current location, and so forth. Implementations may employ any suitable technique for determining the current location of the user 102 and/or the user device 104. For example, location may be determined using a satellite-based navigation system such as the global positioning system (GPS). The current vehicle 112 and/or the other (e.g., nearby) vehicle(s) may include new vehicle(s), used vehicle(s), and/or both new and used vehicle(s). The current vehicle 112 and/or the other vehicle(s) may include vehicle(s) that are available for purchase and/or vehicle(s) that are available for rental or lease.

Although examples herein may describe and/or depict vehicles as automobiles, implementations are not so limited. Vehicle(s) may include automobiles, motorcycles, mopeds, campers, recreational vehicles, off-road vehicles, watercraft, aircraft, and/or other types of vehicles. Moreover, the implementations described herein may also be used to facilitate and/or optimize transactions to purchase or otherwise acquire other types of consumer products, including but not limited to home electronics, appliances, real property (e.g., houses or other structures), and so forth.

In some implementations, the user 102 may be required to login to the application 106, and be authenticated as an authorized user of the application, using credential(s) such as a login name, password, personal identification number (PIN), biometric data, and so forth. In such implementations, the user data 124 may be determined based at least partly on the identity of the user 102 who is logged into the application. In some implementations, the scannable user tag 116 may be employed to generate the user data 124 that identifies the user 102 instead of relying on the user 102 being logged into the application 106. For example, the size of the application 106 may be minimized, and/or the user experience more streamlined, through use of the scannable user tag 116 instead of requiring the user 102 to log in.

In some implementations, the user data 124 may be employed to generate (e.g., prepopulate) a loan application based on the particular financial characteristics or other characteristics of the user 102, such as their credit history, credit score, current lines of credit, employment, and so forth. The user data 124 may also be employed to generate an insurance policy application based on the particular characteristics of the user 102, such as their driving history, location, vehicle usage patterns (e.g., number of miles driven per year), whether the vehicle is to be used for personal and/or commercial purposes, and so forth. The loan application and/or insurance application may be provided to the user 102 in the transaction data 126.

In some implementations, the UI 108 may present at least a portion of the received transaction data 126 in a scorecard that provides the user 102 with a summary of the information regarding the vehicle 112 to be purchased, price (e.g., guaranteed price), loan information (e.g., interest rate, payoff term, etc.) insurance information, total cost of ownership, and so forth. In some implementations, the scorecard may provide multiple sets of information to compare different vehicles, e.g., in a side-by-side comparison. In some instances, the seller of the vehicle 112 may provide a counter-offer with regard to the loan, purchase price, and/or other information. In such instances, the scorecard may enable the user 102 to enter the counter-offer information provided by the dealer to compare with the information provided by the service(s) 120. The service(s) 120 may also update the transaction data 126, e.g., as a counter to the seller's counter-offer, and that information may also be presented in the scorecard. In this way, implementations provide a connection to the service(s) 120 while the user 102 is negotiating with the seller, e.g., to ensure that the user 102 is provided with the best possible deal.

In some implementations, the server device(s) 118 execute one or more external service application protocol interfaces (APIs) 128 to enable the server device(s) 118 to request information from external services. For example, the API(s) 128 may be employed to retrieve, from external service(s), price information for a vehicle (e.g., a guaranteed price), repair and/or maintenance history for the vehicle 112, financial information regarding the user 102 (e.g., to be used to generate the loan application), and so forth. In some implementations, instead of or in addition to using an external API 128 to determine price information for a vehicle, and/or other information regarding the vehicle, a local model may be employed to determine such information. For example, the server device(s) 118 may access a model that outputs an estimated price for a vehicle based on input of a make, model, and year of the vehicle and/or based on default trim options for the vehicle. Local model(s) may also be employed to determine estimated maintenance and/or repair costs, estimated fuel costs, and so forth, for the vehicle.

Through the integration of loan application processing, insurance application processing, pricing data (e.g., for a guaranteed vehicle price), and/or other information, implementations provide a seamless and/or expedited process for purchasing a vehicle or other item. This process may be personalized for the particular user 102, e.g., the loan information, insurance information, and/or other transaction data 126 may be particularly generated for and tailored to the user 102. The implementations described herein may be employed to provide the user 102 with a seamless, hassle-free, vehicle buying experience that may involve less negotiation than traditional vehicle buying experiences. In some implementations, the vehicle 112 may be purchased without requiring the user 102 to negotiate and/or haggle with a seller and/or sales personnel at a dealership. In some implementations, the system may include a kiosk or other device that dispenses one or more keys to the user 102 if the user 102 completes the purchase, as described further below.

Figure 2:
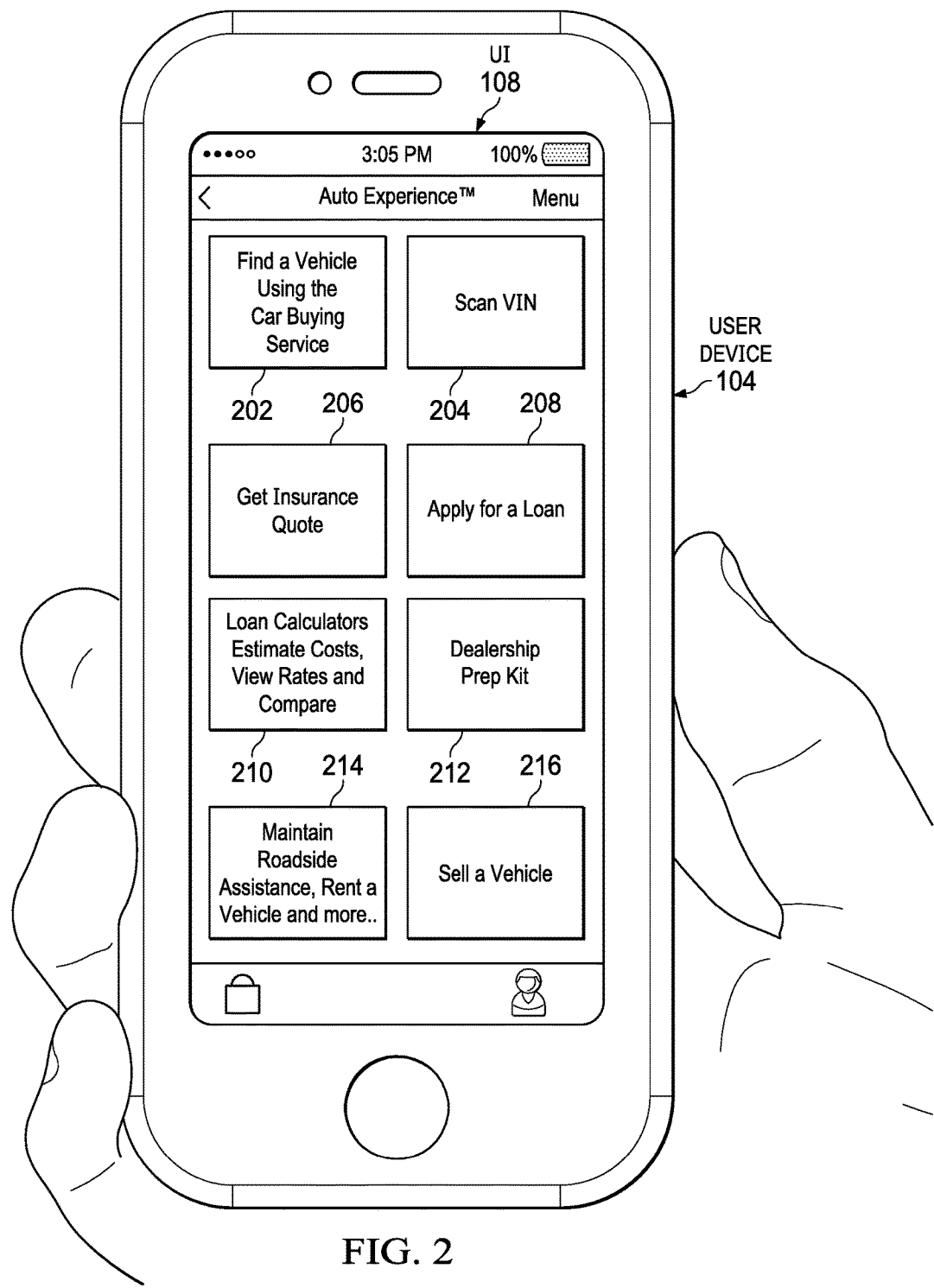
FIGS. 2-4 depict example user interfaces for transaction processing, according to implementations of the present disclosure.
Figure 3:
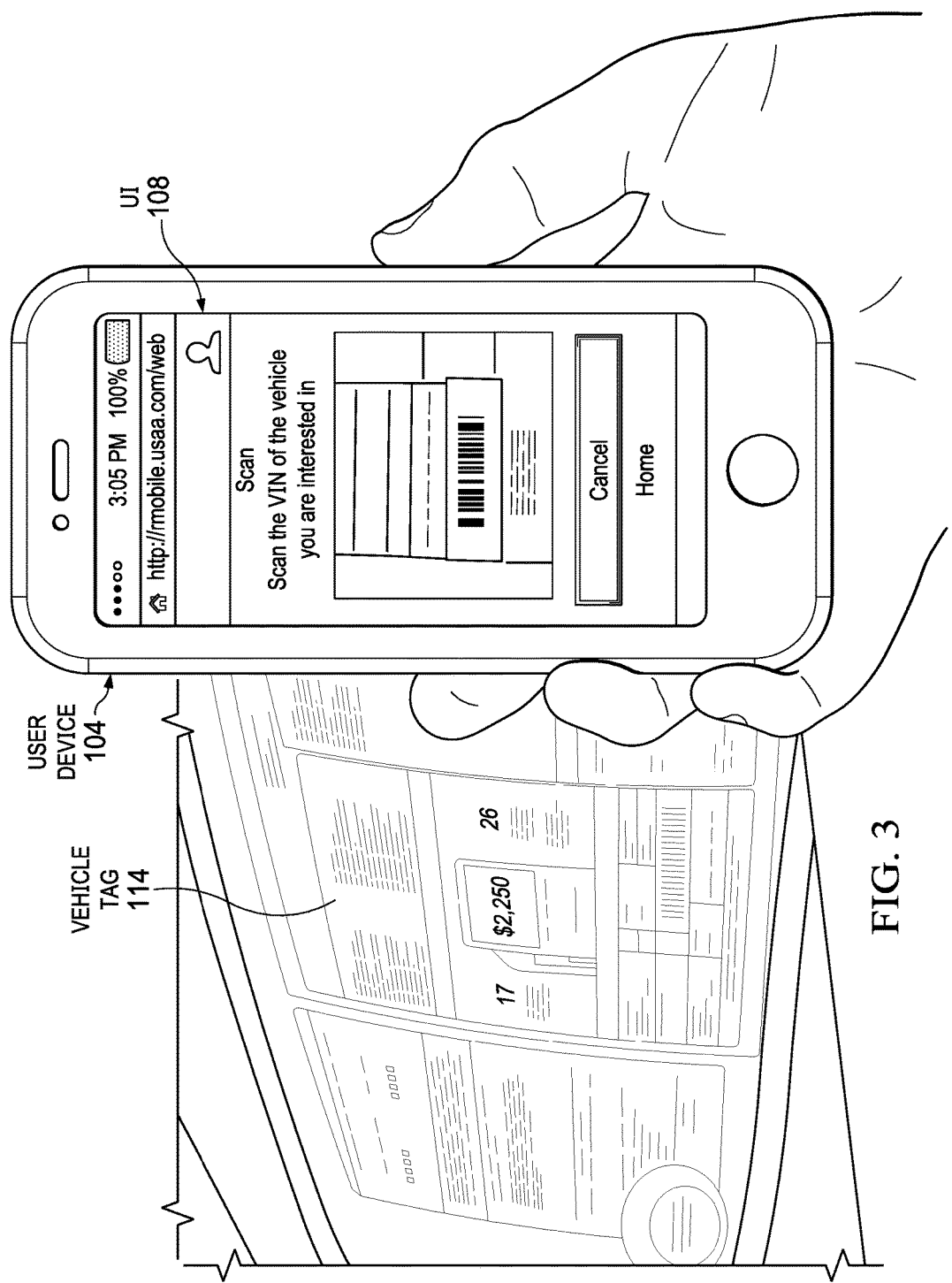
Figure 4:
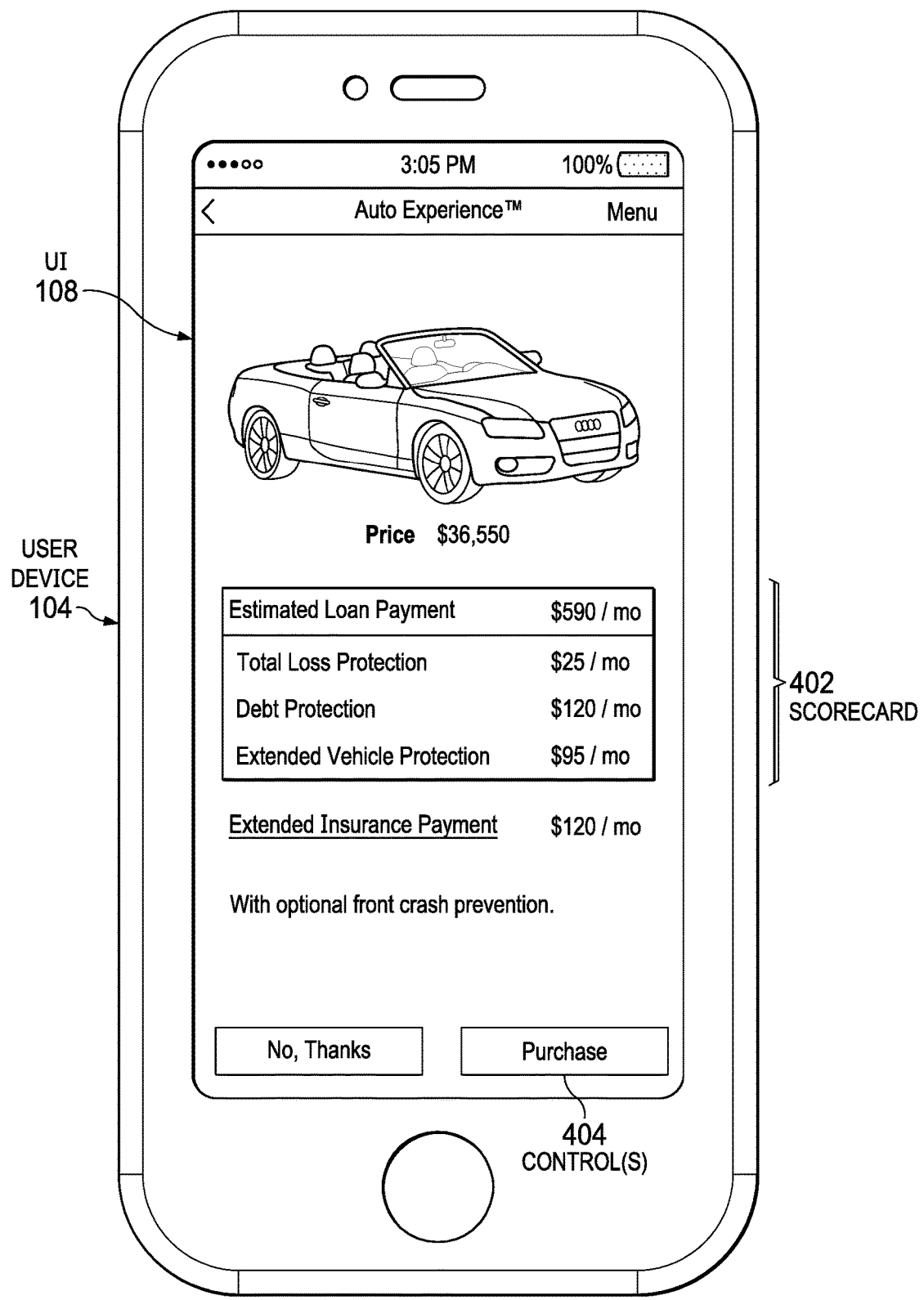

FIGS. 2-4 depict examples of the UI 108 that may be used for transaction processing, according to implementations of the present disclosure. In the example of FIG. 2, the UI 108 is presenting a set of features (also described as options) available through the application 106.

The "Find a Vehicle" option 202 may present a list of vehicles that are available for purchase within a user-specified range or distance. The list of vehicles may be generated in response to search criteria specified by the user, such as make, model, year, color, price range, distance, type of vehicle, engine type, new or used vehicles, and/or other options.

The "Scan VIN" option 204 may be used to scan the tag 114 on a particular vehicle 112, e.g., if the user is located near a vehicle at a showroom or other sales location.

The "Get Insurance Quote" option 206 may be used to request that an insurance policy quote be generated for the user 102 for a particular selected or scanned vehicle 112.

The "Apply for a Loan" option 208 may be used to request that a loan application be generated for the user 102 to finance the purchase of a particular vehicle 112 or a particular price of a vehicle. In some instances, the user 102 may specify criteria for a loan, such as the particular monthly payment they wish to pay, and the loan application may be generated based on the user-specified criteria, purchase price of the vehicle, financial data regarding the user 102, and so forth.

The "Loan Calculators" option 210 may be used to access one or more loan calculators to estimate monthly payments, total cost of the loan, and/or other loan characteristics based on inputs such as a purchase price, interest rate, term of the loan, and so forth.

The "Dealership Prep Kit" option 212 may be used to access various features that allow the user 102 to prepare for visiting a dealership, such as a set of questions that may be asked of the dealer, add-ons to watch out for (e.g., undercoating, extended warranties, etc.), and so forth.

The "Maintain" option 214 may be used to access various features regarding the maintenance of a vehicle, such as requesting roadside assistance, repairs, rental vehicles, and so forth.

The "Sell a Vehicle" option 216 may be used to access features to assist the user 102 in selling a vehicle.

FIG. 3 depicts an example UI 108 in which the user 102 is scanning a tag 114 on a vehicle 112. In this example, the tag 114 is a printed sticker and/or decal affixed to the vehicle 112, describing characteristics of the vehicle 112. The tag 114 may be optically scanned (e.g., using camera(s) 110) and presented in the UI 108. In some implementations, the application 106 may analyze the tag 114 to extract vehicle data 122 from the tag 114 such as using OCR to extract text data, scanning a barcode (e.g., UPC, QR code, or other scannable code) to extract data encoded in the barcode, and so forth.

FIG. 4 depicts an example UI 108 in which the user 102 is viewing transaction data 126 for a particular vehicle 112, such as the vehicle 112 for which the tag 114 was scanned as in FIG. 3. The UI 108 may present a price for the vehicle 112. The price may be a guaranteed price, as described above. The UI 108 may also present a scorecard 402 describing particular aspects of the transaction data 126. In the example shown, the scorecard 402 is presenting an estimated loan payment for a loan to finance the vehicle purchase, insurance information such as total loss protection, debt protection, extended vehicle protection, and an estimated insurance payment. The UI 108 may present control(s) 404 that enable the user 102 to purchase the vehicle 112 shown in the UI 108, or opt not to make the purchase (e.g., "No Thanks").

In some implementations, the scorecard 402 provides for the user a summary or digest of information that is relevant to the user's purchase and ongoing ownership of the vehicle. For example, the scorecard 402 may present a summary of the insurance coverage for the car, including the types of coverage (e.g., collision, uninsured motorist, debt protection, total loss protection, extended vehicle protection, etc.) and/or costs of the coverage (e.g., monthly premiums, deductibles, limits or lack thereof, etc.). The scorecard 402 may also present a summary of the cost of purchasing the vehicle, including terms of a loan such as interest rate and/or monthly payments to be paid on the loan. The scorecard 402 may also present a summary of other costs of owning the vehicle, such as one or more of the following: expected maintenance and/or repair costs given the make, model, and year of the vehicle, determined based on a request to an external API and/or through a maintenance and/or repair cost prediction model; expected fuel costs given the make, model, and year of the vehicle, and/or given information regarding the user's expected usage for the vehicle (e.g., daily commutes to work, long cross-country drives, participation in a ridesharing service, etc.); depreciation costs, given the make, model, and year of the vehicle, and based on information describing expected depreciation in the value of the vehicle (e.g., resale value) over time. Accordingly, the scorecard 402 may provide a total cost of ownership (TCO) of the vehicle, such as a total monthly cost of owning the vehicle, including a sum of the monthly loan payment, monthly insurance premium, monthly fuel costs, and expected monthly maintenance and/or repair costs. TCO may be determined per month, as described above, or for any other appropriate periodicity (e.g., yearly cost of ownership, etc.).

Figure 5:
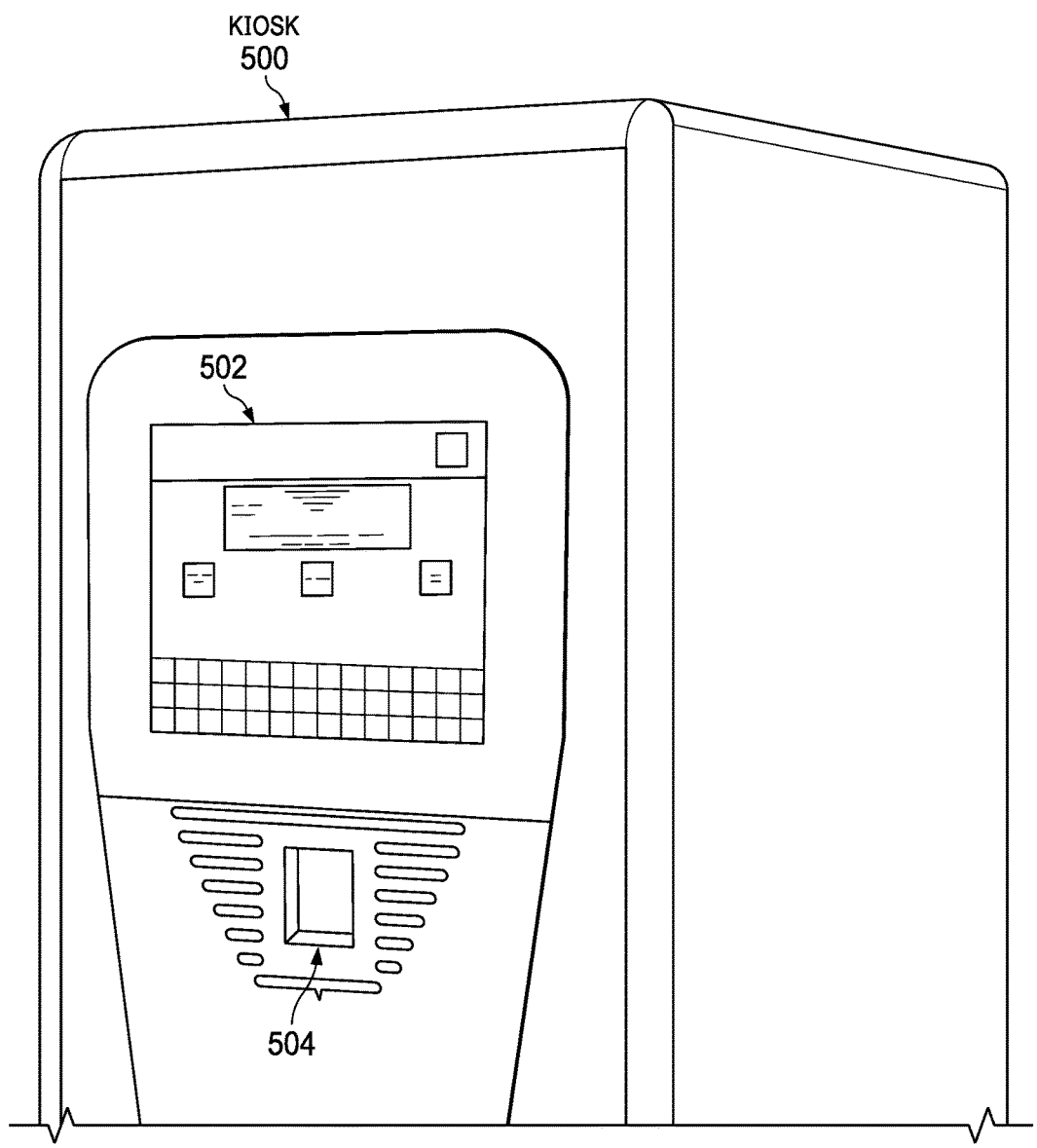
FIG. 5 depicts an example kiosk for key delivery, according to implementations of the present disclosure.

FIG. 5 depicts an example kiosk 500 for key delivery, according to implementations of the present disclosure. If the user 102 opts to purchase the vehicle 112, e.g., through the UI 108 as shown in FIG. 4, a code may be communicated from the service(s) 120 to the user device 104 and the code may be presented in the UI 108. A signal may also be sent to the kiosk 500 to indicate that the particular code is associated with the particular vehicle 112 that has been purchased. The user 102 may enter the code into an interface 502 of the kiosk 500, e.g., keyboard, touchscreen, display, etc. If the correct code is entered, the key(s) for the vehicle 112 may be dispensed by the kiosk 500 through a key dispenser opening 504. The user 102 may retrieve the key(s) and use the key(s) to access and operate the vehicle 112. In this way, implementations enable the user 102 to purchase a vehicle 112, arrange financing for the vehicle 112, insure the vehicle 112, and drive the vehicle 112 off the sales lot without ever needing to speak with a sales representative.

Figure 6:
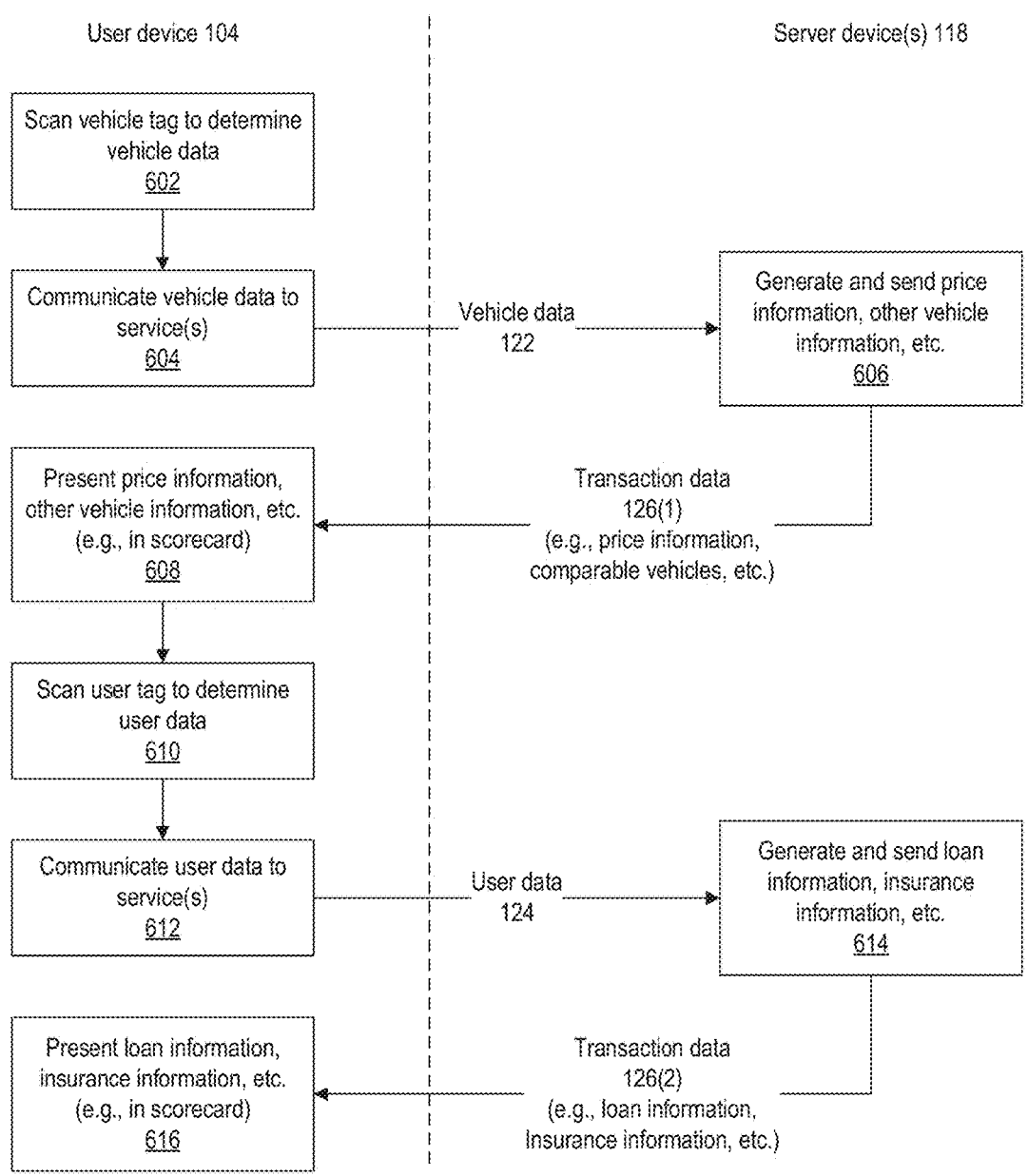
FIG. 6 depicts a flow diagram of an example process for transaction processing, according to implementations of the present disclosure.

FIG. 6 depicts a flow diagram of an example process for transaction processing, according to implementations of the present disclosure. Operations of the process may be performed by one or more of the application 106, the UI 108, the transaction service(s) 120, the external service API(s) 128, and/or other software module(s) executing on the user device 104, the server device(s) 118, or elsewhere.

The vehicle tag 114 may be scanned (602) to determine the vehicle data 122, as described above.

The vehicle data 122, e.g., a VIN, may be communicated (604) to the service(s) 120 from the user device 104. Based on the vehicle data 122, the service(s) 120 may generate and send (606) price information, information regarding other similar vehicles that are nearby, and/or other types of transaction data 126.

The transaction data 126 may be sent (606) to the user device 104 and presented (608) in the UI 108, e.g., in the scorecard 402.

The user tag 116 may be scanned (610) to determine the user data 124, as described above.

The user data 124 may be communicated (612) to the service(s) 120 from the user device 104. Based on the user data 124 and/or vehicle data 122, the service(s) 120 may generate and send (614) loan information, insurance information, and/or other transaction data 126 to facilitate the user's purchase of the vehicle 112.

The transaction data 126 may be sent (614) to the user device 104 and presented (616) in the UI 108, e.g., in the scorecard 402. Based on the presented transaction data 126 in the UI 108, the user 102 may select to purchase the vehicle 112, not purchase the vehicle 112, compare the current vehicle 112 to other vehicles, request more information, request modification of the loan terms, insurance policy, and/or other aspects of the transaction data 126, and/or put off the decision to another time.

Figure 7:
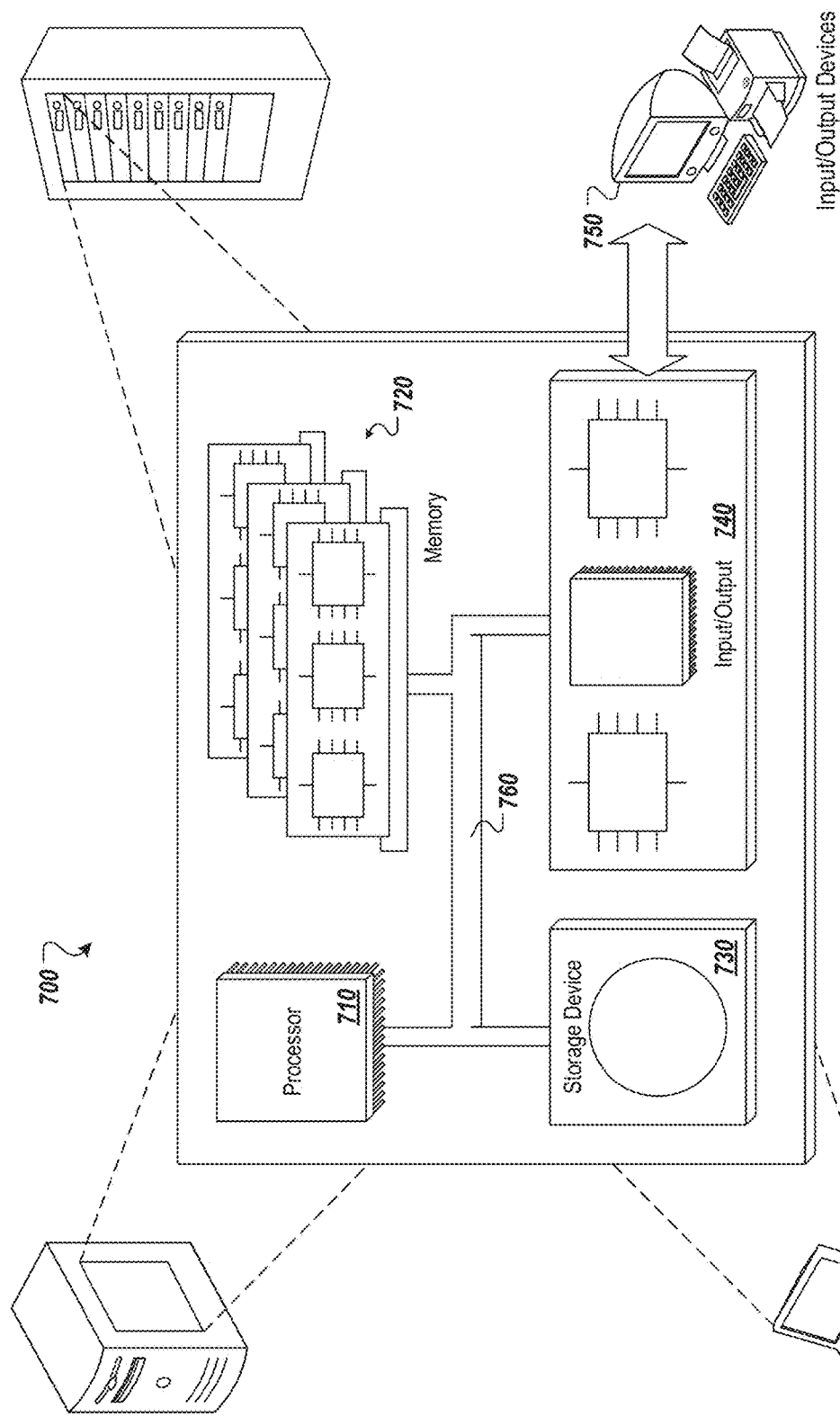
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the user device(s) 104, server device(s) 118, and/or other computing device(s) or system(s) described herein. The system 700 may include one or more processors 710, a memory 720, one or more storage devices 730, and one or more input/output (I/O) devices 750 controllable through one or more I/O interfaces 740. The various components 710, 720, 730, 740, or 750 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computing system comprising:
at least one processor; and
memory communicatively coupled to the at least one processor, the memory storing instructions which, when executed by the at least one processor, instruct the at least one processor to perform operations comprising:
- receiving vehicle data associated with a vehicle, wherein the vehicle data is retrieved through a scan, by at least one scanning component, of a vehicle tag that includes the vehicle data;
- transmitting, over at least one network, the vehicle data to at least one transaction service executing on at least one remote server computing device;
- receiving transaction data that is generated by the at least one transaction service based at least partly on the vehicle data, wherein the transaction data describes a loan to purchase the vehicle; and
- presenting the transaction data in a user interface (UI).

2. The computing system of claim 1, the operations further comprising:
- transmitting, over the at least one network to the at least one transaction service, a request to purchase the vehicle, the request provided through the UI.

3. The computing system of claim 1, the operations further comprising:
- transmitting, over the at least one network, user data to the at least one transaction service, wherein the user data is associated with a purchaser of the vehicle, and wherein the transaction data is generated by the at least one transaction service further based on the user data.

4. The computing system of claim 3, wherein the user data is retrieved through a scan, by the at least one scanning component, of a user tag that includes the user data.

5. The computing system of claim 4, wherein:
- the user tag is a physical credential of the purchaser; and
- scanning the user tag includes capturing at least one image of the physical credential and performing pattern recognition to determine, as at least a portion of the user data, one or more of a name and an identification number that is on the physical credential.

6. The computing system of claim 1, wherein:
- the vehicle tag is a decal affixed to the vehicle; and
- scanning the vehicle tag includes capturing at least one image of the decal and performing pattern recognition to determine, as at least a portion of the vehicle data, a vehicle identification number (VIN) that is on the decal.

7. The computing system of claim 1, wherein:
- the vehicle tag includes a scannable barcode; and
- scanning the vehicle tag includes capturing at least one image of the scannable barcode and decoding the scannable barcode to determine, as at least a portion of the vehicle data, a vehicle identification number (VIN) that is encoded in the scannable barcode.

8. The computing system of claim 1, wherein the transaction data further includes one or more of vehicle history information and vehicle cost information.

9. The computing system of claim 1, wherein:
- the at least one transaction service includes a first transaction service and a second transaction service;
- the vehicle data is received by the first transaction service and communicated to the second transaction service which, in response, determines a price of the vehicle based on the vehicle data and communicates the price to the first transaction service; and
- the first transaction service generates the transaction data based at least on the price.

10. The computing system of claim 1, wherein the transaction data is valid for a limited period of time.

11. A computer-implemented method performed by at least one processor, the method comprising:
- receiving, by the at least one processor, vehicle data associated with a vehicle, wherein the vehicle data is retrieved through a scan, by at least one scanning component, of a vehicle tag that includes the vehicle data;
- transmitting, by the at least one processor, over at least one network, the vehicle data to at least one transaction service executing on at least one remote server computing device;
- receiving, by the at least one processor, transaction data that is generated by the at least one transaction service based at least partly on the vehicle data, wherein the transaction data describes a loan to purchase the vehicle; and
- presenting, by the at least one processor, the transaction data in a user interface (UI).

12. The method of claim 11, further comprising:
- transmitting, by the at least one processor, over the at least one network to the at least one transaction service, a request to purchase the vehicle, the request provided through the UI.

13. The method of claim 11, further comprising:
- transmitting, by the at least one processor, over the at least one network, user data to the at least one transaction service, wherein the user data is associated with a purchaser of the vehicle, and wherein the transaction data is generated by the at least one transaction service further based on the user data.

14. The method of claim 13, wherein the user data is retrieved through a scan, by the at least one scanning component, of a user tag that includes the user data.

15. The method of claim 14, wherein:
- the user tag is a physical credential of the purchaser; and
- scanning the user tag includes capturing at least one image of the physical credential and performing pattern recognition to determine, as at least a portion of the user data, one or more of a name and an identification number that is on the physical credential.

16. The method of claim 11, wherein:
- the vehicle tag is a decal affixed to the vehicle; and
- scanning the vehicle tag includes capturing at least one image of the decal and performing pattern recognition to determine, as at least a portion of the vehicle data, a vehicle identification number (VIN) that is on the decal.

17. The method of claim 11, wherein:
- the vehicle tag includes a scannable barcode; and
- scanning the vehicle tag includes capturing at least one image of the scannable barcode and decoding the scannable barcode to determine, as at least a portion of the vehicle data, a vehicle identification number (VIN) that is encoded in the scannable barcode.

18. The method of claim 11, wherein the transaction data further includes one or more of vehicle history information and vehicle cost information.

19. The method of claim 11, wherein:
- the at least one transaction service includes a first transaction service and a second transaction service;
- the vehicle data is received by the first transaction service and communicated to the second transaction service which, in response, determines a price of the vehicle based on the vehicle data and communicates the price to the first transaction service; and
- the first transaction service generates the transaction data based at least on the price.

20. One or more non-transitory computer-readable media storing instructions which, when executed by at least one processor, cause the at least one processor to perform operations comprising:
    receiving vehicle data associated with a vehicle, wherein the vehicle data is retrieved through a scan, by at least one scanning component, of a vehicle tag that includes the vehicle data;
    transmitting, over at least one network, the vehicle data to at least one transaction service executing on at least one remote server computing device;
    receiving transaction data that is generated by the at least one transaction service based at least partly on the vehicle data, wherein the transaction data describes a loan to purchase the vehicle; and
    presenting the transaction data in a user interface (UI).

* * * * *